United States Patent
Mikkola et al.

(10) Patent No.: US 10,279,286 B2
(45) Date of Patent: May 7, 2019

(54) METHOD FOR CONSTRUCTING A VACUUM BELT FILTER DEVICE AND VACUUM BELT FILTER DEVICE

(71) Applicant: OUTOTEC (FINLAND) OY, Espoo (FI)

(72) Inventors: Harri Mikkola, Lappeenranta (FI); Pekka Suihkonen, Lappeenranta (FI); Matti Luoma, Lappeenranta (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/559,978

(22) PCT Filed: Mar. 23, 2016

(86) PCT No.: PCT/FI2016/050186
§ 371 (c)(1),
(2) Date: Sep. 20, 2017

(87) PCT Pub. No.: WO2016/151201
PCT Pub. Date: Sep. 29, 2016

(65) Prior Publication Data
US 2018/0104626 A1    Apr. 19, 2018

(30) Foreign Application Priority Data
Mar. 24, 2015   (FI) ...................... 20155203

(51) Int. Cl.
*B01D 33/056*   (2006.01)
*B01D 33/04*    (2006.01)
*B65G 15/60*    (2006.01)

(52) U.S. Cl.
CPC ........... *B01D 33/056* (2013.01); *B01D 33/04* (2013.01); *B01D 2201/204* (2013.01); *B65G 15/60* (2013.01)

(58) Field of Classification Search
CPC .................. B01D 33/056; B01D 33/04; B01D 2201/204; B65G 15/60
See application file for complete search history.

(56) References Cited

U.S. PATENT DOCUMENTS 3,104,223 A  *  9/1963  Kasuya ............... B01D 33/745
                                                    210/400
4,285,815 A  *  8/1981  Gallottini .............. B01D 33/04
                                                    210/400

(Continued)

FOREIGN PATENT DOCUMENTS

EP    0172013 A2   2/1986
FR    2309265 A1   11/1976

(Continued)

OTHER PUBLICATIONS

Finnish Search Report issued by the Finnish Patent and Registration Office in relation to Finnish Patent Application No. 20155203 dated Oct. 12, 2015 (1 page).

(Continued)

*Primary Examiner* — David C Mellon
*Assistant Examiner* — Liam Royce
(74) *Attorney, Agent, or Firm* — Robert P. Michal, Esq.; Carter, DeLuca & Farrell LLP

(57) ABSTRACT

A vacuum belt filter device includes an endless moving filter belt, a vacuum arrangement having a vacuum box having suction openings, and a guide part on opposite sides of the suction openings. Each guide part is arranged between the vacuum box and the endless moving filter belt. Each guide part has a first groove, and an endless seal belt configured to run in the first groove in contact with the low pressure side. A detachable wear strip is arranged in the first groove of each guide part between the endless seal belt and the guide part.

6 Claims, 9 Drawing Sheets

(56) References Cited

U.S. PATENT DOCUMENTS

Figure 1:
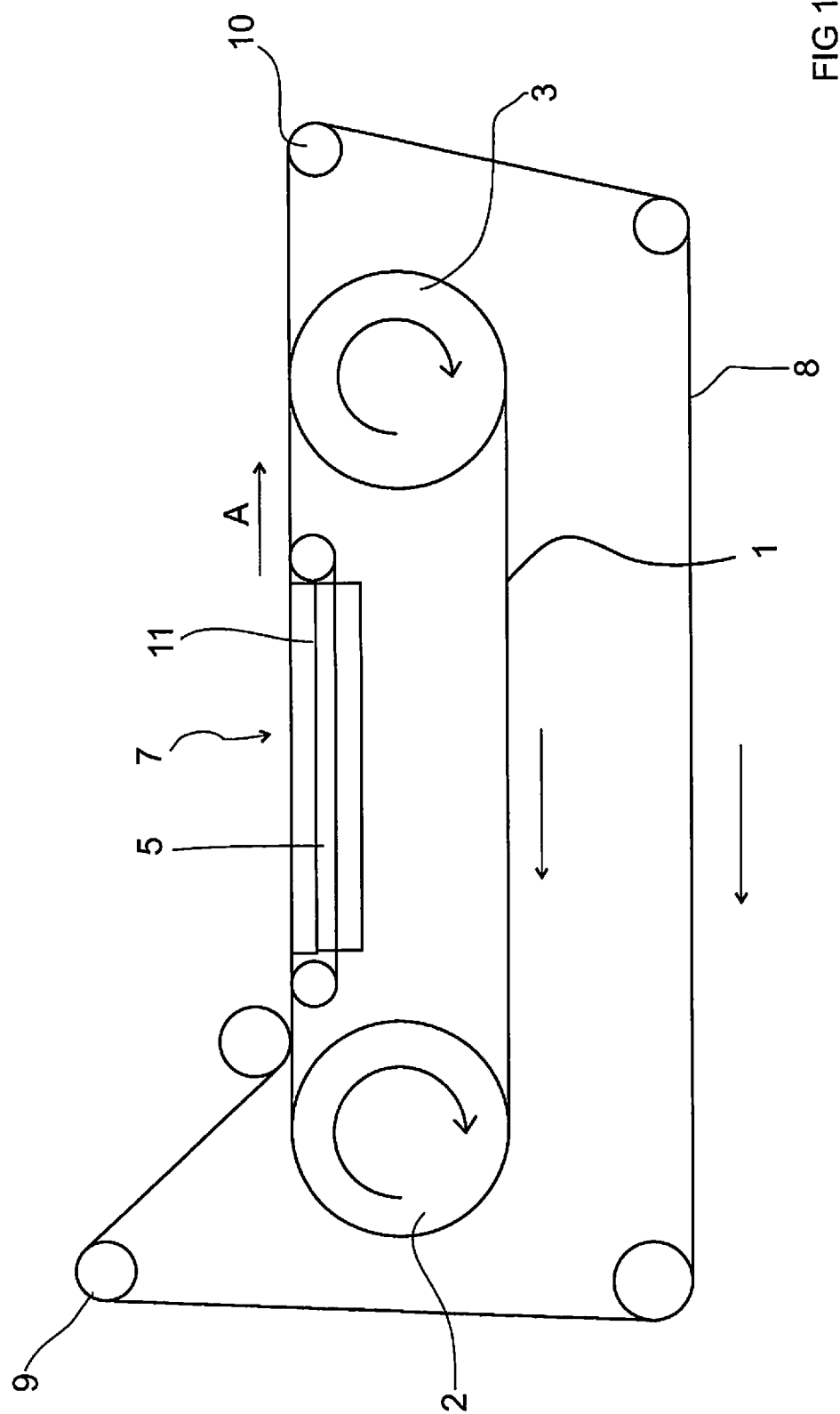

| | | | |
|---|---|---|---|
| 4,338,193 A | | 7/1982 | Lautrette et al. |
| 4,673,514 A | | 6/1987 | Casey et al. |
| 5,055,091 A | | 10/1991 | Morris, Jr. et al. |
| 5,240,609 A | * | 8/1993 | Langley ............... B01D 33/042 |
| | | | 210/386 |

FOREIGN PATENT DOCUMENTS

| | | | |
|---|---|---|---|
| GB | 2064974 A | 6/1981 | |
| ZA | 7806257 B | 1/1980 | |
| ZA | 8700975 B | 9/1987 | |

OTHER PUBLICATIONS

International Preliminary Report on Patentability issued by the European Patent Office acting as the International Preliminary Examining Authority in relation to International Patent Application No. PCT/FI2016/050186 dated Jun. 29, 2017 (7 pages).
International Search Report issued by the European Patent Office acting as the International Searching Authority in relation to International Patent Application No. PCT/FI2016/050186 dated Aug. 8, 2016 (6 pages).
Written Opinion of the International Searching Authority issued by the European Patent Office acting as the International Searching Authority in relation to International Patent Application No. PCT/FI2016/050186 dated Aug. 8, 2016 (9 pages).
Chinese Office Action issued by the State Intellectual Property Office of the Peoples Republic of China in relation to Chinese Application No. 201680017509.4 dated Dec. 21, 2018 (8 pages) along with English language translation (8 pages).

* cited by examiner

METHOD FOR CONSTRUCTING A VACUUM BELT FILTER DEVICE AND VACUUM BELT FILTER DEVICE

CROSS-REFERENCE TO RELATED APPLICATIONS

This application is a National Phase Entry under 35 USC § 371 of PCT Patent Application Serial No. PCT/FI2016/050186 filed Mar. 23, 2016, which claims priority to Finnish Patent Application No. 20155203, filed Mar. 24, 2015, the disclosure of each of these applications is expressly incorporated herein by reference in their entirety.

FIELD OF THE INVENTION

The invention relates to a method for constructing a vacuum belt filter device as defined in the preamble of independent claim 1, wherein the method comprises providing an endless moving filter belt, providing a vacuum arrangement, which comprises a vacuum box having suction openings and which is configured to produce a suction at a low pressure side of the endless moving filter belt at a working zone of the vacuum belt filter device, providing a guide part on opposite sides of the suction openings of the vacuum box, by arranging each guide part between the vacuum box and the low pressure side of the endless moving filter belt, and providing each guide part with a first groove extending in the moving direction A of the endless moving filter belt, and providing an endless seal belt to run with respect to the first groove of each guide part in the moving direction A of the endless moving filter belt in contact with the low pressure side of the endless moving filter belt.

The invention also relates to a vacuum belt filter device as defined in the preamble of independent claim 8, wherein the vacuum belt filter device comprises an endless moving filter belt, a vacuum arrangement, which comprises a vacuum box having suction openings and which is configured to produce a suction at a low pressure side of the endless moving filter belt at a working zone of the vacuum belt filter device, a guide part on opposite sides of the suction openings of the vacuum box, wherein each guide part is arranged between the vacuum box and the low pressure side of the endless moving filter belt, and wherein each guide part has a first groove extending in the moving direction A of the endless moving filter belt, and an endless seal belt configured to run with respect to the first groove of each guide part in the moving direction A of the endless moving filter belt in contact with the low pressure side of the endless moving filter belt.

Publication GB 2 064 974 presents a moving belt filter.
Publication U.S. Pat. No. 4,673,514 presents a fluid film bearing for use in horizontal belt vacuum filters.
Publication EP 0 172 013 presents a vacuum filter apparatus.

OBJECTIVE OF THE INVENTION

The object of the invention is to provide a method for constructing a vacuum belt filter device and a vacuum belt filter device, so that quick and easy maintenance of the guide parts with respect to which the endless seal belts run in contact with a low pressure side of the endless moving filter belt of the vacuum belt filter device is provided for, and to provide a detachable wear strip and a combination of a guide part and a detachable wear strip for use in the method and in the vacuum belt filter device.

SHORT DESCRIPTION OF THE INVENTION

The method for constructing a vacuum belt filter device of the invention is characterized by the device defined in a first independent claim.

Preferred embodiments of the method are defined in the dependent claims which depend on the first independent claim.

The vacuum belt filter device of the invention is correspondingly characterized by the device defined in a second independent claim.

Preferred embodiments of the vacuum belt filter device are defined in the dependent claims which depend on the second independent claim.

One aspect of the invention is based on providing detachable wear strips between the endless seal belt and the guide part.

LIST OF FIGURES

Figure 2:
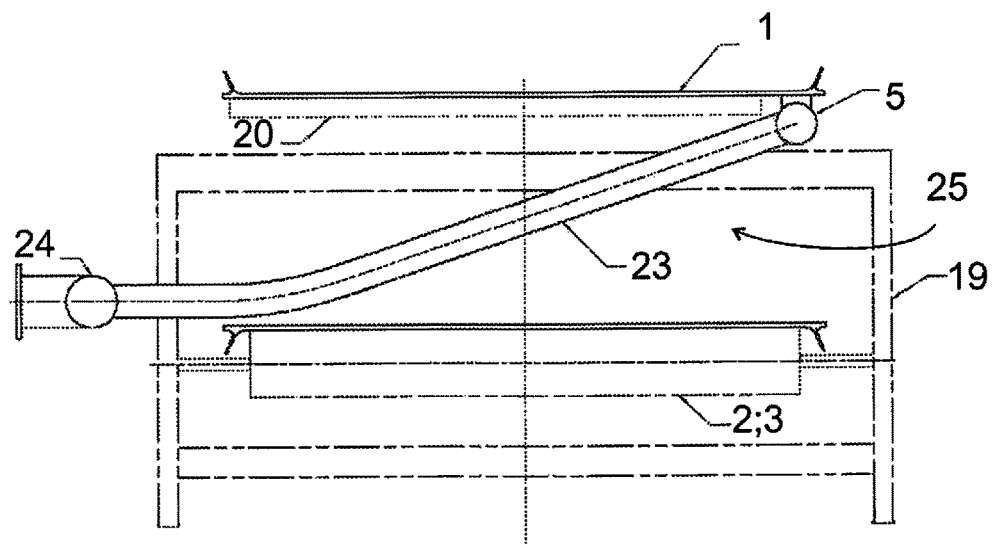
Figure 3:
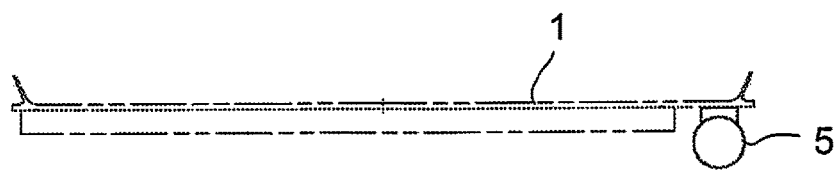
Figure 4:
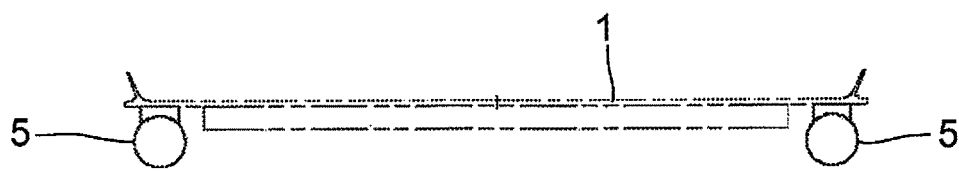
Figure 5:
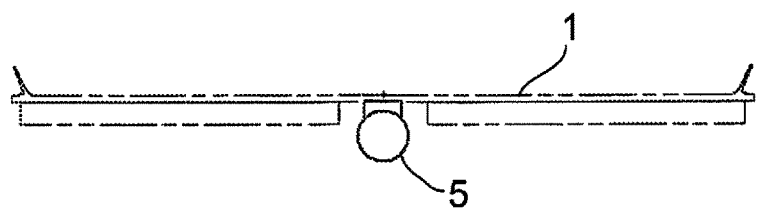
Figure 6:
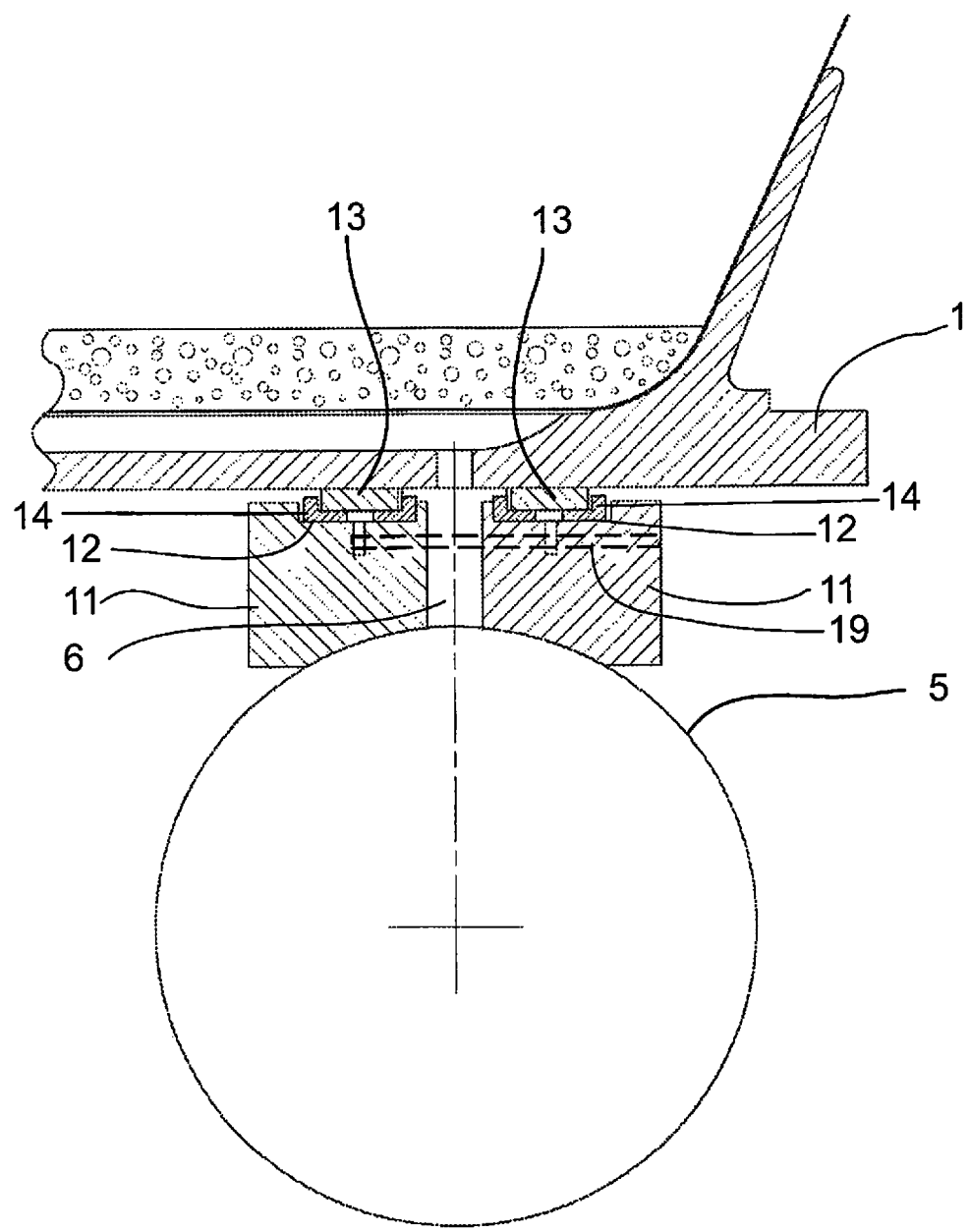
Figure 7:
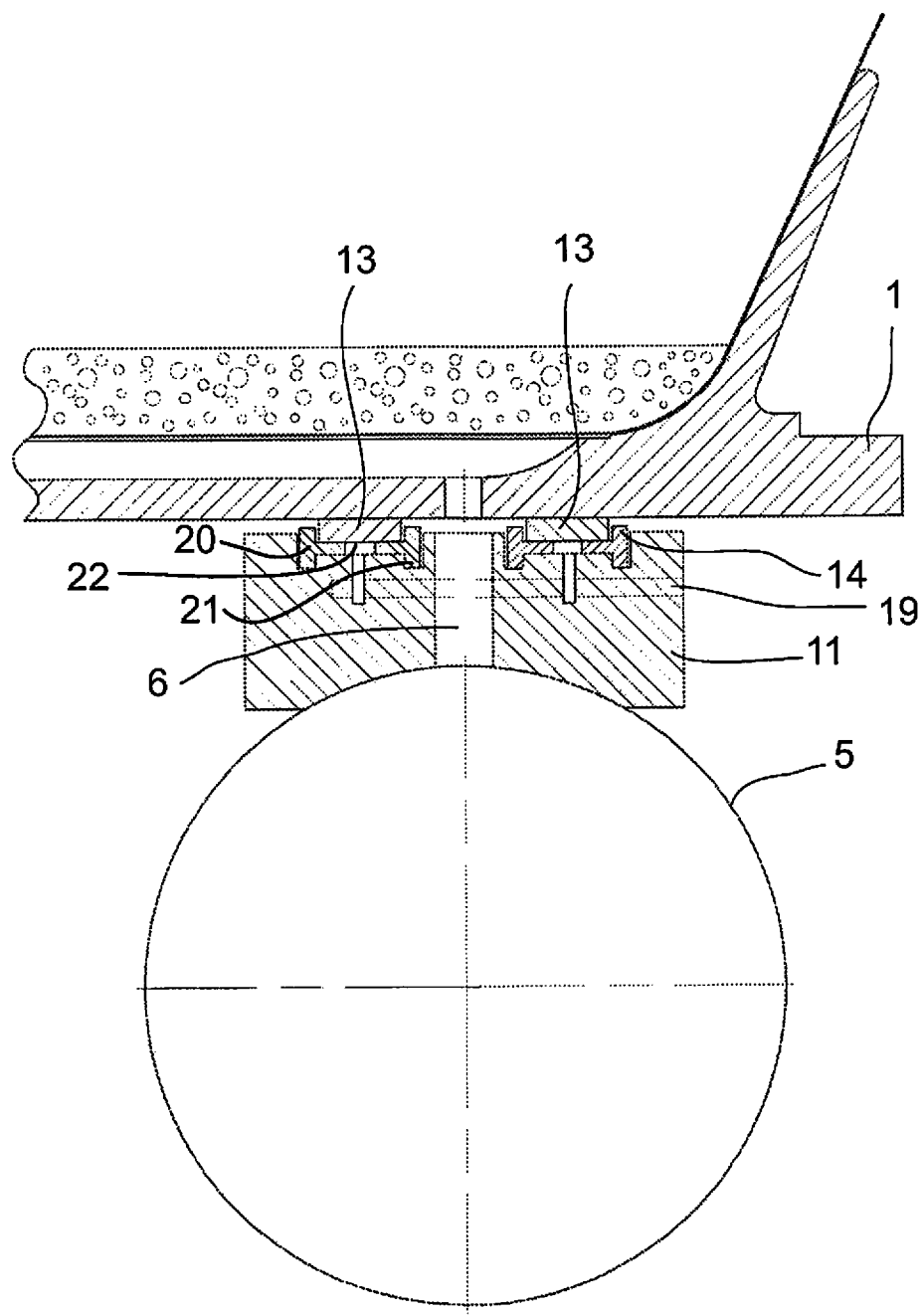
Figure 8:
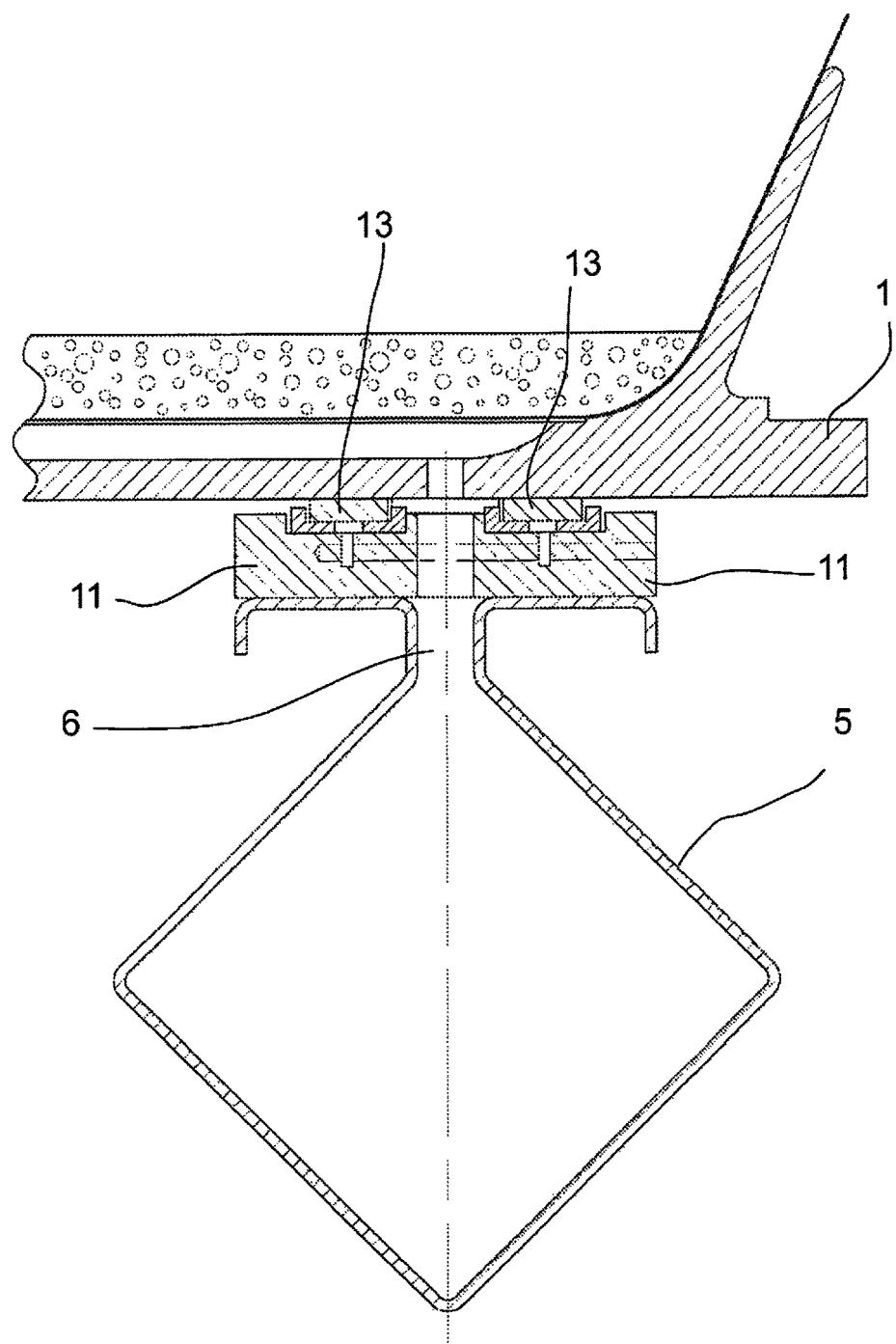
Figure 9:
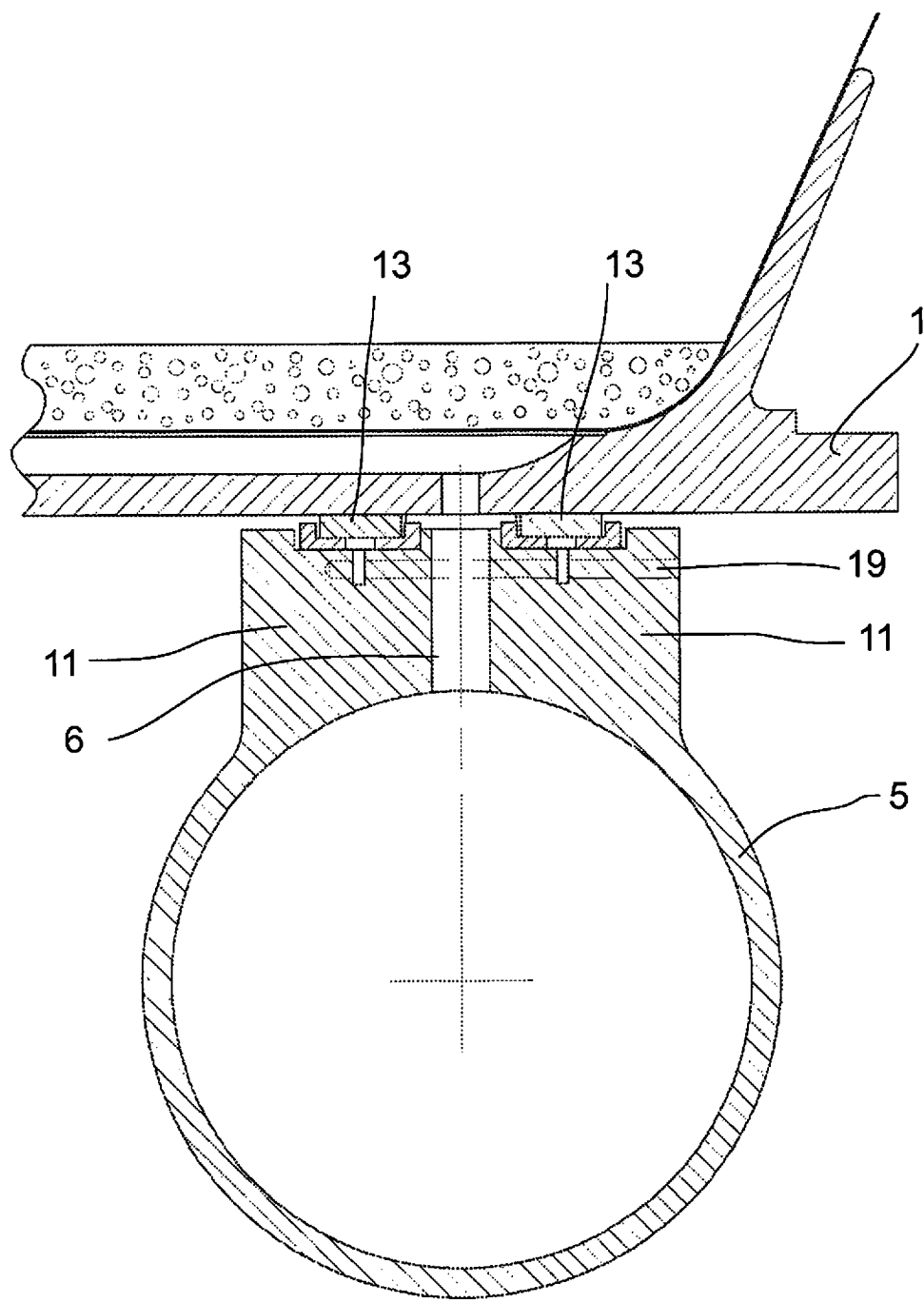
Figure 10:
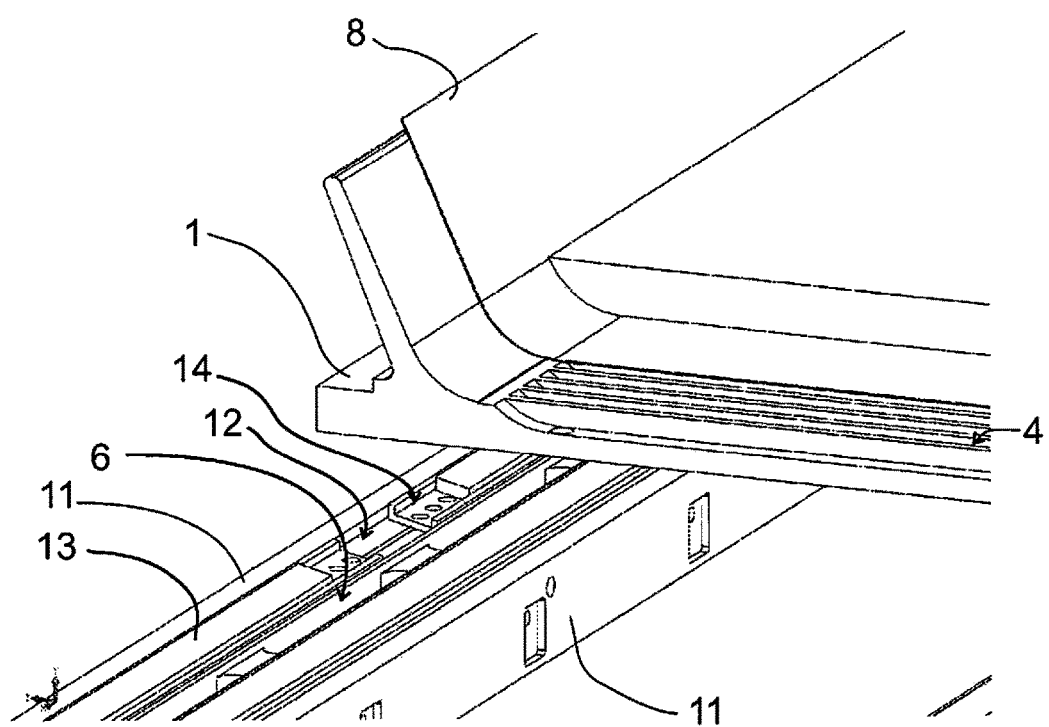
Figure 11:
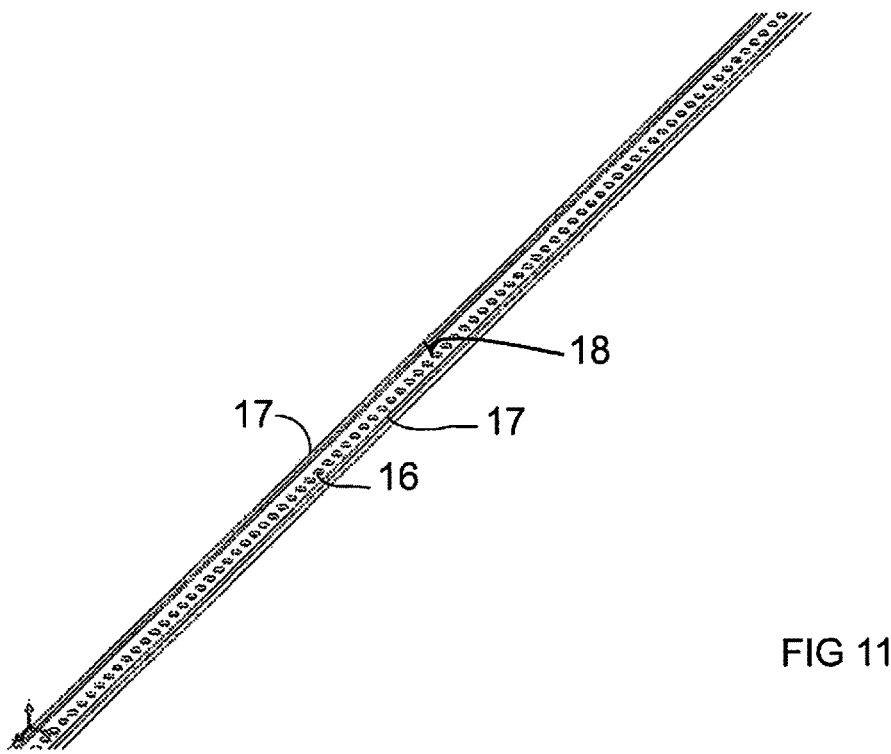
Figure 12:
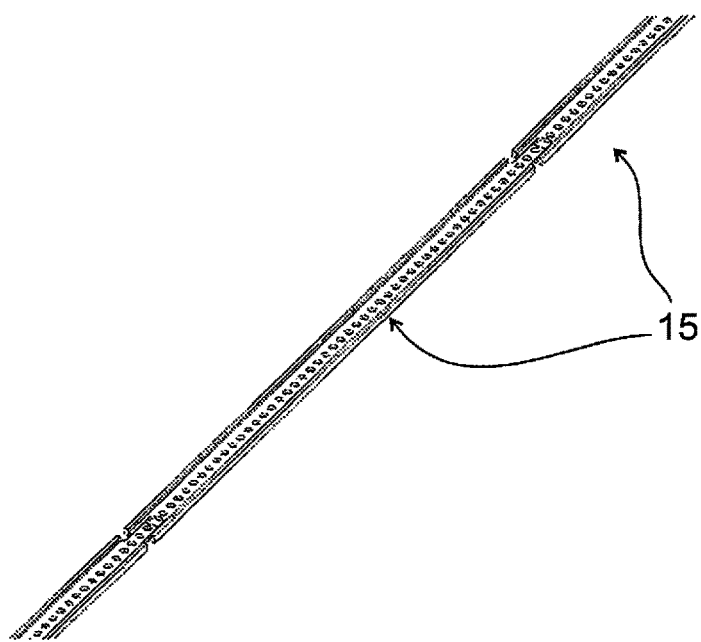
Figure 13:
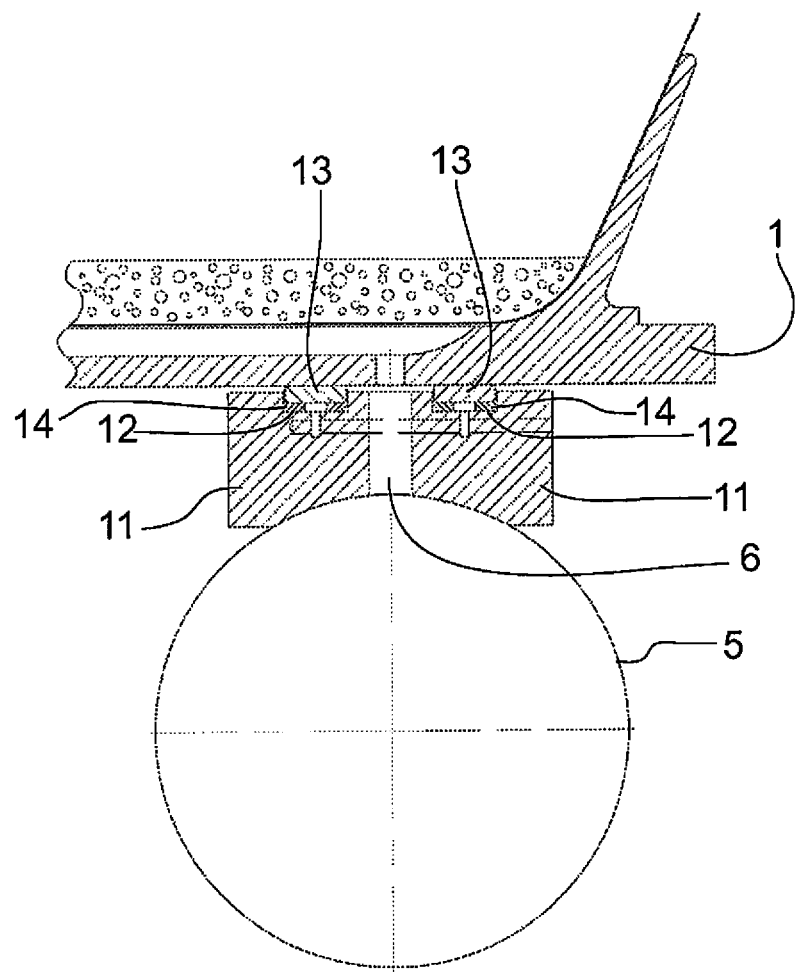

In the following the invention will described in more detail by referring to the figures, which FIG. 1 shows a vacuum belt filter device according to an embodiment, FIG. 2 shows in cut view a vacuum belt filter device according to another embodiment, FIG. 3 shows a detail of the vacuum belt filter device shown in FIG. 2, FIG. 4 shows a detail of the vacuum belt filter device shown in FIG. 2, FIG. 5 shows a detail of the vacuum belt filter device shown in FIG. 2, FIG. 6 shows in cut view a detail of the vacuum belt filter device, FIG. 7 shows an alternative to the configuration shown in FIG. 6, FIG. 8 shows another alternative to the configuration shown in FIG. 6, FIG. 9 shows still another alternative to the configuration shown in FIG. 6, FIG. 10 shows in cut view a detail of the vacuum belt filter device, FIG. 11 shows a first embodiment of the wear strip, FIG. 12 shows a second embodiment of the wear strip, FIG. 13 shows an alternative to the configuration shown in FIG. 6.

DETAILED DESCRIPTION OF THE INVENTION

First the method for constructing a vacuum belt filter device configured to extract solids from a suspension containing solids and some embodiments and variants of the method will be described in greater detail.

The method comprises providing an endless moving filter belt 1, which may revolve around at least a first roller 2 and a second roller 3, and which preferably, but not necessarily, has transversal grooves 4 extending transversely to a moving direction A of the endless moving filter belt 1 at a high pressure side of the endless moving filter belt 1.

The method comprises providing a vacuum arrangement 25, which comprises a vacuum box 5 having suction openings 6, which may extend in the moving direction A of the endless moving filter belt 1, and which vacuum arrangement 25 is configured to produce a suction at a low pressure side (not marked with a reference numeral) of the endless moving filter belt 1 at a working zone 7 of the vacuum belt filter device. The suction openings 6 may be longitudinally arranged suction openings. The vacuum arrangement 25 shown in FIG. 2 comprises also vacuum tubing 23 and a manifold arrangement 24.

The method may comprise providing an endless moving filter cloth 8 that revolves around at least a third roller 9 and a fourth roller 10, and arranging the endless moving filter cloth 8 on a high pressure side (not marked with a reference numeral) of the endless moving filter belt 1 at the working zone 7 of the vacuum belt filter device and in contact with the high pressure side of the endless moving filter belt 1 at the working zone 7 of the vacuum belt filter device.

The method comprises providing a guide part 11 on opposite sides of the suction openings 6, such as on opposite sides of longitudinally arranged suction openings, of the vacuum box 5, by arranging each guide part 11 between the vacuum box 5 and the low pressure side of the endless moving filter belt 1, and providing each guide part 11 with a first groove 12 extending in the moving direction A of the endless moving filter belt 1. The guide part 11 may comprise several guide part sections (not shown in the figures). The guide part 11 may be made of polymer, rubber, metal, ceramic or a combination of at least two of polymer, rubber, metal, and ceramic. The guide parts 11, which are provided on opposite sides of the suction opening 6, between the vacuum box 5 and the low pressure side of the endless moving filter belt 1 may be integral parts of a guide member (not shown in the figures).

The method may comprise providing a vacuum box 5, where the guide part 11 is an integral part of the vacuum box 5 as shown in FIG. 9. Alternatively, the method may comprise providing a vacuum box 5, where the guide part 11 is a separate part of the vacuum box 5 as shown in FIGS. 6, 7, 8 and 13.

The method comprises providing an endless seal belt 13 configured to run with respect to the first groove 12 of each guide part 11, preferable in the first groove 12 of each guide part 11, in the moving direction A of the endless moving filter belt 1 in contact with the low pressure side of the endless moving filter belt 1.

The method comprises providing the groove of each guide part 11 with a detachable wear strip 14 between the endless seal belt 13 and guide part 11. The method may comprise providing the guide part 11 with fluid feeding means 19 for feeding lubrication fluid and/or sealing fluid to the first groove 12 in the guide part 11.

The method may comprise perforating the detachable wear strip 14 for allowing lubricating fluid such as water to flow through the detachable wear strip 14.

The method may, as shown in the embodiment illustrated in FIG. 12, comprise forming the detachable wear strip 14 by releasable connecting together a plurality of wear strip parts 15.

The method may, as shown in the embodiment illustrated in FIG. 11, comprise providing a detachable wear strip 14 that is in one-piece form.

The method may comprise providing a detachable wear strip 14 having an elongated base portion 16 having lateral side edges and longitudinal side flanges 17 such as upstanding to longitudinal at each lateral side edge so that a second groove 18 for the endless seal belt 13 is formed on the elongated base portion 16 between the longitudinal side flanges 17. The longitudinal side flanges 17 may be in the form of upstanding longitudinal side flanges as is shown in the FIGS. 6 to 12. Alternatively, the method may comprise providing a detachable wear strip 14 formed of an elongated base portion 16, as shown in FIG. 13.

The width of the detachable wear strip 14 corresponds preferably, but not necessarily, essentially to the width of the first groove 12 of the guide part.

The width of the endless seal belt 13 corresponds preferably, but not necessarily, essentially to the width of the possible second groove 18 in the detachable wear strip 14.

As an alternative to what is shown for example in FIG. 6, the method may, as shown in FIG. 7 comprise providing a detachable wear strip 14 comprising a first wear strip section 20 and a second wear strip section 21, and arranging the first wear strip section 20 to extend alongside the second wear strip section between the guide part 11 and the endless seal belt 13 in the first groove 12 of the guide part 11 so that an interspace 22 is formed between the first wear strip section 20 and the second wear strip section 21 for allowing lubricating fluid such as water to flow between the first wear strip section 20 and the second wear strip section 21. In such case, the method may comprise forming the first wear strip section 20 by releasable connecting together a plurality of wear strip section parts (not shown in the figures), and forming the second wear strip section 21 by releasable connecting together a plurality of wear strip section parts (not shown in the figures). Alternatively, the method may in such case comprise providing a first wear strip section 20 that is in single-piece form, and providing a second wear strip section 21 that is in single-piece form. In such case, the method may comprise forming a second elongated groove, in which the endless seal belt 13 is configured to move, together by means of the first wear strip section 20 and of the second wear strip section 21. In such case, the method may comprise providing a first wear strip section 20 and a second wear strip section 21 each having a lateral side edge and an longitudinal side flange 17 at the lateral side edge, and releasable arranging the first wear strip section 20 and the second wear strip section 21 between the guide part 11 and the endless seal belt 13 in the first groove 12 of the guide part 11 so that the first wear strip section 20 and the second wear strip section 21 form together a second groove 18 for the endless seal belt 13.

The method may comprise making the detachable wear strip 14 of at least one of the following: polymer, metal, or ceramic.

Next the vacuum belt filter device and some embodiments and variants thereof will be described in greater detail.

The vacuum filter belt device comprises an endless moving filter belt 1, which may revolve around at least a first roller 2 and a second roller 3, and which preferably, but not necessarily, has transversal grooves 4 extending transversely to a moving direction A of the endless moving filter belt 1 at a high pressure side (not marked with a reference numeral) of the endless moving filter belt 1.

The vacuum filter belt device comprises a vacuum arrangement 25, which comprises a vacuum box 5 having suction openings 6, which may extend in the moving direction A of the endless moving filter belt 1, and which vacuum arrangement 25 is configured to produce a suction at a low pressure side (not marked with a reference numeral) of the endless moving filter belt 1 at a working zone 7 of the vacuum belt filter device. The suction openings may be longitudinally arranged suction openings. The vacuum arrangement 25 shown in FIG. 2 comprises also vacuum tubing 23 and a manifold arrangement 24.

The vacuum filter belt device may comprise an endless moving filter cloth 8 that revolves around at least a third roller 9 and a fourth roller 10 and that is arranged in contact with a high pressure side of the endless moving filter belt 1 at the working zone 7 of the vacuum belt filter device.

The vacuum filter belt device comprises a guide part 11 on opposite sides of the suction openings 6 of the vacuum box 5, wherein each guide part 11 is arranged between the vacuum box 5 and the low pressure side of the endless moving filter belt 1, and wherein guide part 11 has a first groove 12 extending in the moving direction A of the endless moving filter belt 1. The guide part 11 may comprise several guide part sections (not shown in the figures). The guide part 11 may be made of polymer, rubber, metal, ceramic or a combination of at least two of polymer, rubber, metal, and ceramic. The guide parts 11 on opposite sides of the suction opening 6, between the vacuum box 5 and the low pressure side of the endless moving filter belt 1 may be integral parts of a guide member (not shown in the figures).

The guide part 11 may be an integral part of the vacuum box 5 as shown in FIG. 9. Alternatively, the guide part 11 may be a separate part of the vacuum box 5 as shown in FIGS. 6 and 7.

The vacuum filter belt device comprises an endless seal belt 13 configured to run with respect to the first groove 12 of each guide part 11, preferably in the first groove 12 of each guide part 11, in the moving direction A of the endless moving filter belt 1 in contact with the low pressure side of the endless moving filter belt 1.

The vacuum filter belt device comprises a detachable wear strip 14 arranged, during normal working operation of the vacuum filter belt device, immovable in the first groove 12 of each guide part 11 between the endless seal belt 13 and the guide part 11.

The guide part 11 may comprise fluid feeding means 19 for feeding lubrication fluid to the first groove 12 in the guide part 11.

The detachable wear strip 14 may be perforated for allowing lubricating fluid such as water to flow through the detachable wear strip 14.

The detachable wear strip 14 may, as shown in FIG. 12, comprise a plurality of wear strip parts 15 releasable connected together to form the detachable wear strip 14.

The detachable wear strip 14 may, as shown in FIG. 11, be in one-piece form.

The detachable wear strip 14 may have an elongated base portion 16 having lateral side edges and longitudinal side flanges 17 at each lateral side edge so that a second groove 18 for the detachable wear strip 14 is formed on the elongated base portion 16 between the longitudinal side flanges 17. The longitudinal side flanges 17 may be in the form of upstanding longitudinal side flanges as shown in FIGS. 6 to 12. Alternatively, detachable wear strip 14 may be formed of an elongated base portion 16, as shown in FIG. 13.

The width of the detachable wear strip 14 corresponds preferably, but not necessarily, essentially to the width of the first groove 12 of the guide part.

The width of the endless seal belt 13 corresponds preferably, but not necessarily, essentially to the width of the possible second groove 18 in the detachable wear strip 14.

As an alternative to the embodiments shown for example in FIG. 6, the detachable wear strip 14 may, as shown in FIG. 7, comprise a first wear strip section 20 and a second wear strip section 21, so that the first wear strip section 20 extend alongside the second wear strip section 21 between the guide part 11 and the endless seal belt 13 in the first groove 12 of the guide part 11 so that an interspace 22 is formed between the first wear strip section 20 and the second wear strip section 21 for allowing lubricating fluid such as water to flow between the first wear strip section 20 and the second wear strip section 21. In such case, a least one of the first wear strip section 20 and the second wear strip section 21 may comprise a plurality of wear strip section parts (not shown in the figures) releasable connected together to form the first wear strip section 20, or correspondingly, the second wear strip section 21. Alternatively, in such case at least one of the first wear strip section 20 and the second wear strip section 21 may be in single-piece form.

If the detachable wear strip 14 comprise a first wear strip section 20 and a second wear strip section 21 as describe above, the first wear strip section 20 and the second wear strip section 21 may together form a second elongated groove in which the endless seal belt 13 is configured to move.

If the detachable wear strip 14 comprise a first wear strip section 20 and a second wear strip section 21 as describe above, each of the first wear strip section 20 and the second wear strip section 21 may have a lateral side edge and a longitudinal side flange 17 at the lateral side edge, and the first wear strip section 20 and the second wear strip section 21, when releasable arranged between the guide part 11 and the endless seal belt 13 in the first groove 12 of the guide part 11, forming together a second groove 18 for the wear strip.

The detachable wear strip 14 may be made of at least one of the following: polymer, metal, or ceramic.

Next a detachable wear strip 14 for use in the method according to the invention and in a vacuum belt filter device according to the invention will be described in greater detail.

The detachable seal strip 14 comprises an elongated base portion 16 having lateral side edges and longitudinal side flanges 17 at each lateral side edge so that a second groove 18 for the endless seal belt 13 is formed on the elongated base portion 16 between the longitudinal side flanges 17. The longitudinal side flanges 17 may be in the form of upstanding longitudinal side flanges as shown in the figures.

The elongated base portion 16 of the detachable wear strip 14 is preferably, but not necessarily, perforated for allowing lubricating fluid and/or sealing fluid such as water to flow through the detachable wear strip 14.

The elongated base portion 16 may be perforated so that the perforations form openings such as circular openings in the elongated base portion 16.

If the elongated base portion 16 is perforated so that the perforations form openings, the total cross-section area of the openings may be between 1 and 50%, preferably between 5 and 30%, more preferable between 7 and 20%, even more preferable between 8 and 15% of the area of the area of the elongated base portion (16).

If the elongated base portion 16 is perforated so that the perforations form openings, each opening may having a cross-section area between 5 mm$^2$ and 800 mm$^2$, preferably between 20 mm$^2$ and 500 mm$^2$, more preferably between 50 mm$^2$ and 300 mm$^2$ such as 200 mm$^2$.

The detachable wear strip 14 may, as shown in FIG. 12, comprise a plurality of wear strip parts 15 releasable connected together to form the detachable wear strip 14.

Alternatively, the detachable wear strip 14 may, as shown in FIG. 11, be in one-piece form.

The width of the detachable wear strip 14 corresponds preferably, but not necessarily, essentially to the width of the first groove 12 of a guide part in which the detachable wear strip 14 is configured to be arranged.

The width of the second groove 18 in the detachable wear strip 14 corresponds preferably, but not necessarily, essentially to the width of the endless seal belt 13 that is to be arranged in the second groove 18 in the detachable wear strip 14.

The detachable wear strip 14 is preferably, but not necessarily, made of at least one of the following: polymer, metal, or ceramic.

The detachable wear strip 14 may have a width between 25 mm and 60 mm, preferably between 35 mm and 45 mm, more preferably between 39 mm and 43 mm, such as 41 mm.

The detachable wear strip 14 may have a thickness between 2 mm and 7 mm, preferably between 3 mm and 6 mm, more preferable between 4 mm and 5 mm.

The depth of the second groove 18 being between 2 mm and 11 mm, preferably between 3 mm and 8 mm, more preferably between 4 mm and 6 mm, such as 5 mm.

The invention relates also to a combination of a guide part 11 and a detachable wear strip 14 for use in the method according to the invention and in a vacuum belt filter device according to the invention. The guide part 11 has a first groove 12, and the detachable wear strip 14 is detachable arranged in the first groove 12 of the guide part 11.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for constructing a vacuum belt filter device configured to extract solids from a suspension containing solids, wherein the method comprises:
   providing an endless moving filter belt;
   providing a vacuum arrangement, which comprises a vacuum box having suction openings and which is configured to create a suction at a low pressure side of the endless moving filter belt at a working zone of the vacuum belt filter device;
   providing a guide part on each side of the suction openings of the vacuum box by arranging each respective guide part between the vacuum box and the low pressure side of the endless-moving filter belt, wherein the guide parts disposed on each side of the suction openings of the vacuum box are disposed in opposed relation to one another, and providing each respective guide part with a first groove extending in the moving direction of the endless moving filter belt;
   providing an endless seal belt to run with respect to the first groove of each guide part in the moving direction of the endless moving filter belt in contact with the low pressure side of the endless moving filter belt;
   providing the first groove of each respective guide part with a detachable wear strip between the endless seal belt and guide part so that the detachable wear strip is arranged in the first groove, the detachable wear strip having an elongated base portion having lateral side edges and longitudinal side flanges at each lateral side edge so that a second groove for the endless seal belt is formed on the elongated base portion between the longitudinal side flanges;
   providing each guide part with fluid feeding means comprising a conduit for feeding lubrication fluid and/or sealing fluid to the first groove in each guide part so that lubrication fluid and/or sealing fluid is fed through each guide part to the first groove in each guide part;
   forming the detachable wear strip by releasably connecting together a plurality of wear strip parts; and
   perforating the elongated base portion of the detachable wear strip for allowing lubrication fluid and/or sealing fluid to flow through the detachable wear strip.

2. The method according to claim 1, further comprising making the detachable wear strip of at least one of a polymer, metal, or ceramic.

3. The method according to claim 1, wherein providing the endless moving filter cloth includes providing the endless moving filter cloth that revolves around at least a third roller and a fourth roller, and arranging the endless moving filter cloth on a high pressure side of the endless moving filter belt at the working zone of the vacuum belt filter device and in contact with the high pressure side of the endless moving filter belt at the working zone of the vacuum belt filter device.

4. A vacuum belt filter device comprising:
   an endless moving filter belt;
   a vacuum arrangement, which comprises a vacuum box having suction openings and which is configured to produce a suction at a low pressure side of the endless moving filter belt at a working zone of the vacuum belt filter device;
   a guide part disposed on each side of the suction openings of the vacuum box, wherein each respective guide part is arranged between the vacuum box and the low pressure side of the endless moving filter belt, wherein the guide parts disposed on each side of the suction openings of the vacuum box are disposed in opposed relation to one another, and wherein each respective guide part has a first groove extending in the moving direction of the endless moving filter belt; and
   an endless seal belt configured to run with respect to the first groove of each guide part in the moving direction of the endless moving filter belt in contact with the low pressure side of the endless moving filter belt,
   wherein a detachable wear strip arranged in the first groove of each guide part between the endless seal belt and the guide part, the detachable wear strip having an elongated base portion having lateral side edges and longitudinal side flanges at each lateral side edge so that a second groove for the endless seal belt is formed on the elongated base portion between the longitudinal side flanges, wherein the detachable wear strip comprises a plurality of wear strip parts releasably connected together to form the detachable wear strip,
   the guide part comprising fluid feeding means comprising a conduit for feeding lubrication fluid and/or sealing fluid to the first groove in the guide part, so that lubrication fluid and/or sealing fluid is fed through each guide part to the first groove in each guide part, and
   the elongated base portion of the detachable wear strip being perforated for allowing lubrication fluid and/or sealing fluid to flow through the detachable wear strip.

5. The vacuum belt filter device according to claim 4, wherein the detachable wear strip being made of at least one of the following: polymer, metal, or ceramic.

6. The vacuum belt filter device according to claim 4, wherein an endless moving filter cloth that revolves around at least a third roller and a fourth roller and that is arranged in contact with a high pressure side of the endless moving filter belt at the working zone of the vacuum belt filter device.

* * * * *